US008302622B2

(12) United States Patent
Pena De Santiago

(10) Patent No.: US 8,302,622 B2
(45) Date of Patent: Nov. 6, 2012

(54) UNBALANCED INLET FUEL TUBE FOR A FUEL PRESSURE REGULATOR

(75) Inventor: Saul Abelardo Pena De Santiago, Newport News, VA (US)

(73) Assignee: Continental Automotive Systems US, Inc., Auburn Hills, MI (US)

( * ) Notice: Subject to any disclaimer, the term of this patent is extended or adjusted under 35 U.S.C. 154(b) by 337 days.

(21) Appl. No.: 12/711,303

(22) Filed: Feb. 24, 2010

(65) Prior Publication Data

US 2011/0204268 A1 Aug. 25, 2011

(51) Int. Cl.
*F16K 15/04* (2006.01)

(52) U.S. Cl. ...................................... 137/512.1; 137/539

(58) Field of Classification Search ............... 137/512.1, 137/511, 539
See application file for complete search history.

(56) References Cited

U.S. PATENT DOCUMENTS 2,133,575 A * 10/1938 Rosenberg ................. 137/493.2
3,294,108 A * 12/1966 Thrash .......................... 137/155
3,419,039 A * 12/1968 Monnich ....................... 137/510
3,568,711 A * 3/1971 Katz ........................ 137/516.11
4,825,835 A * 5/1989 Deweerdt ...................... 123/463
4,948,349 A * 8/1990 Koiwa ........................... 417/383
5,035,261 A * 7/1991 Koiwa ...................... 137/516.11
5,394,900 A * 3/1995 Okuyama et al. ............. 137/510
5,429,094 A * 7/1995 Akiba et al. .................. 123/463
5,606,991 A * 3/1997 Kuribayashi .................. 137/510
5,967,177 A * 10/1999 Bueser .......................... 137/510
5,975,115 A * 11/1999 Schwegler et al. ...... 137/315.05
6,269,828 B1 * 8/2001 Kilgore et al. .................. 137/14
6,286,486 B1 * 9/2001 Robinson et al. ............. 123/457
6,334,460 B1 * 1/2002 Hem ............................. 137/508
6,378,500 B1 4/2002 Schreckenberger
6,401,749 B1 * 6/2002 Tai et al. ....................... 137/540
6,782,871 B2 * 8/2004 McIntyre et al. ............. 123/457
6,843,232 B2 * 1/2005 Keesee et al. ................ 123/463
(Continued)

FOREIGN PATENT DOCUMENTS

DE 10022275 A1 12/2000
(Continued)

OTHER PUBLICATIONS

International Search Report dated Jun. 15, 2011, from corresponding International Patent Application No. PCT/US2011/025604.

*Primary Examiner* — John Rivell
*Assistant Examiner* — Umashankar Venkatesan

(57) ABSTRACT

A pressure regulator (10) includes a fuel tube (30) having an inlet end (35), an outlet end (180), and a fuel chamber (40). The outlet end defines a valve seat (70). A valve element (80) engages the valve seat in a closed position to prohibit flow of fuel from the inlet end to the outlet end. The valve element moves to an open position when pressurized fuel builds in the fuel chamber. A valve biasing member (90) biases the valve element towards the valve seat in opposition to the pressurized fuel in the fuel chamber. The fuel tube includes pressure differential creating structure (170) at the outlet end thereof to create a pressure differential around the valve element and cause unbalanced fuel flow at the outlet end to promote the valve element to move towards a certain location at the outlet end when the valve element moves to the open position.

17 Claims, 2 Drawing Sheets

U.S. PATENT DOCUMENTS

| | | | | |
|---|---|---|---|---|
| 6,945,265 | B2 * | 9/2005 | Wynn et al. | 137/12 |
| 7,063,104 | B2 * | 6/2006 | McIntyre et al. | 137/315.05 |
| 7,124,739 | B2 * | 10/2006 | Endoh et al. | 123/457 |
| 7,131,457 | B2 * | 11/2006 | McIntyre et al. | 137/508 |
| 7,819,132 | B2 * | 10/2010 | Etheridge et al. | 137/539 |
| 7,828,010 | B2 * | 11/2010 | Diesing et al. | 137/508 |
| 7,984,728 | B2 * | 7/2011 | Wynn, Jr. | 137/539 |
| 2002/0092565 | A1 * | 7/2002 | Muramatsu et al. | 137/510 |
| 2002/0134433 | A1 * | 9/2002 | Tomczak et al. | 137/510 |
| 2002/0134434 | A1 * | 9/2002 | Schiavone et al. | 137/516.13 |
| 2004/0055646 | A1 * | 3/2004 | Robinson et al. | 137/510 |
| 2004/0177884 | A1 * | 9/2004 | Konishi | 137/540 |
| 2004/0244839 | A1 * | 12/2004 | Wynn, Jr. | 137/510 |
| 2006/0108007 | A1 | 5/2006 | Etheridge et al. | |
| 2008/0149194 | A1 * | 6/2008 | Spiegl et al. | 137/516.21 |
| 2009/0050217 | A1 * | 2/2009 | Worrel | 137/516.13 |

FOREIGN PATENT DOCUMENTS

| | | | |
|---|---|---|---|
| DE | 102005049982 | A1 | 4/2007 |
| FR | 2797310 | A1 | 2/2001 |
| FR | 2925614 | A1 | 6/2009 |
| JP | 2005105987 | A | 4/2005 |
| WO | 2005001280 | A1 | 1/2005 |

* cited by examiner

UNBALANCED INLET FUEL TUBE FOR A FUEL PRESSURE REGULATOR

FIELD

The invention relates to fuel supply systems and, more particularly, to a fuel pressure regulator having a fuel tube that minimizes or eliminates resonant oscillation of a valve element when the regulator is exposed to turbulent fuel flow.

BACKGROUND

Most conventional automotive fuel systems use fuel injectors to deliver fuel to the engine cylinders for combustion. The fuel injectors are mounted on a fuel rail which is supplied with fuel by a fuel pump. The pressure at which the fuel is supplied to the fuel rail must be metered to ensure the proper operation of the fuel injector. Metering is carried out using a pressure regulator that controls the pressure of the fuel in the system at all engine rpm levels.

A conventional flow through pressure regulator is disclosed in U.S. Patent Publication No. 2006/0108007 A1 and includes a lower housing having a fuel inlet wherein a flow of fuel through the inlet communicates with a valve assembly through a fuel chamber defined by a fuel tube. In an open position of a valve element, the valve assembly regulates the flow of fuel through the lower housing to a fuel outlet. In a closed position, the valve element rests on a valve seat to prohibit the flow of fuel from the fuel chamber to the fuel outlet. A valve biasing member biases the valve element toward the fuel chamber in opposition to pressure extend on the valve element by the fuel in the fuel chamber. During normal operation, there is a potential for the valve biasing member to reach a resonant frequency and oscillate when turbulent flow occurs at the inlet, since fuel flow through flow areas of the regulator is balanced. Turbulent flow within the fuel system makes it difficult to determine if the valve element will have the appropriated biased movement in a single direction. The turbulent flow may result in unwanted noise being generated in the fuel system.

To reduce noise, conventionally, the cross section of the fuel tube of the regulator has been modified to create different inside diameters throughout the length of the tube. However, this approach has the disadvantage that many different parts are required for many specific applications, and it is difficult to ensure that the proper part is installed in the specific fuel regulator application.

Thus, there is a need to provide an improved flow through fuel pressure regulator that prevents or minimizes oscillation of the valve element when the regulator is exposed to turbulent fuel flow.

SUMMARY

An objective of the present invention is to fulfill the need referred to above. In accordance with the principles of an embodiment, this objective is obtained by providing a flow through pressure regulator including a fuel tube having an inlet end constructed and arranged to receive fuel, an outlet end, and a fuel chamber between the inlet end and the outlet end. The outlet end defines a valve seat. A valve element is constructed and arranged to engage the valve seat in a closed position to prohibit flow of fuel from the inlet end to the outlet end. A valve biasing member is constructed and arranged to bias the valve element towards the valve seat in opposition to pressure exerted on the valve element by the fuel in the fuel chamber, and to permit the valve element to move to an open position permitting flow of fuel past the outlet end, when pressurized fuel in the fuel chamber is sufficient to move the valve element, against the bias of the valve biasing member, from engagement with the valve seat. The fuel tube includes pressure differential creating structure at the outlet end thereof constructed and arranged to create a pressure differential around the valve element and cause unbalanced fuel flow at the outlet end to promote the valve element to move towards a certain location at the outlet end when the valve element moves to the open position.

In accordance with another aspect of the invention, a fuel tube is provided for a flow through fuel pressure regulator. The fuel tube includes a body having an inlet end constructed and arranged to receive fuel, an outlet end, and a fuel chamber between the inlet end and the outlet end. The outlet end defines a valve seat constructed and arranged to engage with a valve element of the regulator. Pressure differential creating structure is provided at the outlet end that is constructed and arranged to create a pressure differential around the valve element and cause unbalanced fuel flow at the outlet end to promote the valve element to move towards a certain location at the outlet end of the fuel tube when the valve element moves from engagement with the valve seat to an open position.

In accordance with yet another aspect of the invention, a method is provided to prevent a valve element of a flow through pressure regulator from resonating in an open position thereof. The method provides a fuel tube having an inlet end constructed and arranged to receive fuel, an outlet end, and a fuel chamber between the inlet end and the outlet end. The outlet end defines a valve seat constructed and arranged to engage with a valve element of the regulator. A pressure differential is created around the valve element that causes unbalanced fuel flow at the outlet end to promote the valve element to move towards a certain location at the outlet end of the fuel tube when the valve element moves from engagement with the valve seat to the open position.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENTS

Figure 1:
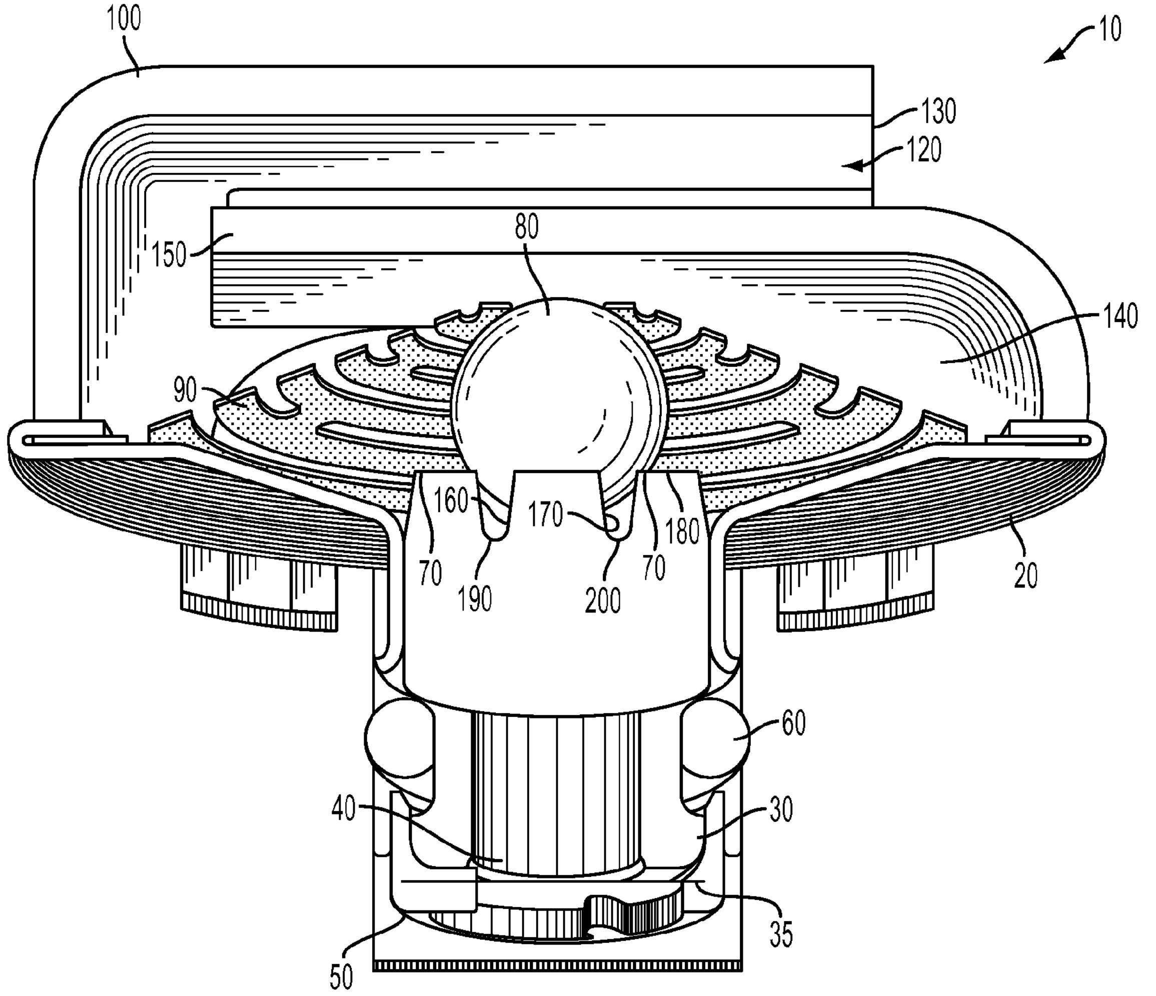
FIG. 1 is a sectional view of a fuel pressure regulator in accordance with an embodiment.
Figure 3:
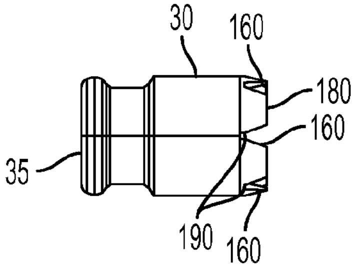
FIG. 3 is a left side view of the fuel tube of FIG. 2.
Figure 2:
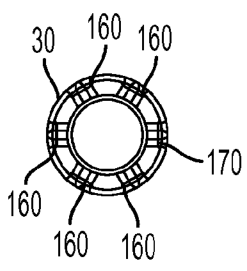
FIG. 2 is a top view of a fuel tube of the fuel pressure regulator of FIG. 1.
Figure 4:
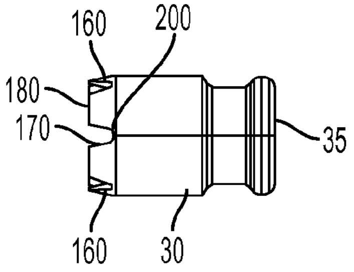
FIG. 4 is a right side view of the fuel tube of FIG. 2, showing pressure differential creating structure.

With reference to FIG. 1, a fuel pressure regulator is shown generally indicated at 10 in accordance with an embodiment of the invention. The regulator 10 is of the type disclosed in U.S. Patent Publication No. 2006/0108007 A1, the contents of which is hereby incorporated into this specification by reference. The flow through pressure regulator 10 includes a lower housing 20 that contains a fuel tube 30. Fuel tube 30 has a body defining an inlet end 35 and an outlet end 180 and a fuel chamber 40 of generally cylindrical in shape between the ends. The fuel chamber 40 channels the fuel into the pressure regulator 10 from a fuel pump (not shown). In the preferred embodiment, fuel tube 30 is made from stainless steel. Fuel will first pass through a fuel filter 50 and into the fuel chamber 40. Fuel filter 50, generally circular in shape, it is disposed around lower portion of fuel tube 30 and adjacent to an O-ring 60. O-ring 60 is positioned below the lower housing 20 to seal and prevent any fuel leakages into other components in the system.

The fuel tube 30 defines a valve seat 70 that cooperates with a valve element 80 that is movably disposed between a closed and an open position. In the closed position, the valve element 80 engages and seals against the seating surface of the valve seat 70 and prevents fuel flow past the valve seat 70. The valve element 80 is biased into the closed position by valve biasing member 90. Valve biasing member 90 is held in place by lower housing 20 which crimps over the outer edge of valve biasing member 90. Others skilled in the art may choose to affix the valve biasing member 90 to lower housing 20 with a weld or clip. Pressurized fuel flows through and accumulates in fuel chamber 40 until the pressurized fuel contacts the bottom surface of the valve element 80. The pressurized fuel will then push valve element 80, against the bias of the valve biasing member 90, off of valve seat 70 into an open position. The fuel flows through the fuel tube 40 and past the valve seat 70. In manufacturing the valve seat 70, the sealing surface is preferably coined to ensure smooth sealing between the valve element 80 and the valve seat 70.

Once the pressurized fuel is released, the valve element 80 is then biased back into the closed position by the valve biasing member 90. Valve biasing member 90 functions to hold the valve element 70 of the flow through pressure regulator 10 in a closed position at a predetermined amount of pressure that is related to the pressure desired by the flow through pressure regulator 10 specification.

In the preferred embodiment, the valve element 80 is shaped as a sphere and maintains a free floating configuration. The valve element 80 is preferably made of ceramic consisting of alumina oxide, to prevent galling from occurring during coining and to reduce wear of the valve seat. The valve element 80 performs in wear, heat, corrosive environments and maintains dimensional stability of temperatures up to 2000 degrees F. The valve element 80 is not retained by other components of the flow through pressure regulator 10 and therefore does not share a permanent contact with the valve biasing member 90. The valve element 80 is free to move both axially and radially when displaced from the valve seat 70. Valve biasing member 90 is positioned on the upper surface of the valve element 80 to assist with movement of the valve element 80 in an axial direction away from the valve seat 70. When the pressure of the inlet fuel is greater than the force exerted by the valve biasing member 90, the fuel pushes the valve element 80 in an axial upward direction and the valve element 80 moves from engagement with the valve seat 70. Fuel flows through the flow through pressure regulator 10 until the bias of the valve biasing member 90 is strong enough to return the valve element 80 to the valve seat 70 thus closing the opening in the valve seat 70. Others skilled in the art may wish to select different shapes for the valve element 80 including a truncated sphere or cone. Others skilled in the art may also choose to weld the valve element 80 to the valve biasing member 90.

The flow through pressure regulator 10 also includes a fuel cover 100 that is preferably made of a plastic molded material and generally houses the flow through pressure regulator 10. Fuel cover 100 includes fuel passageway 120 for directing and turning the flow of fuel from the valve biasing member 90 to fuel outlet 130. The fuel outlet 130 is generally circular in shape and located on the outer edge of cover 100. Fuel cover 100 also acts to keep the valve biasing member 90 submerged in fuel at all times during fuel flow which enhances durability of the valve biasing member 90 as well as dampen vibrating noise of the valve biasing member 90. After exiting valve biasing member 90, the fuel builds in the cover chamber 140 above the valve biasing member 90 and climbs over internal wall 150 and then flows to fuel outlet 130. By this process, the flow of fuel exits in an organized flow and does not discharge in various directions. Similarly, submergence of the valve biasing member 90 in the fuel ensures that the fuel is located on both the top portion and the bottom portion of the valve biasing member 90. Submergence of the valve biasing member 90 in fuel also ensures that the fuel is not aerated which consequently lessens noise in the flow through pressure regulator 10. Lastly, the fuel cover 100 protects the valve biasing member 90 during shipping and handling.

As shown in FIG. 1, the fuel tube 30 includes a plurality of spaced fuel passages 160 surrounding the top portion thereof. The plurality of fuel passages 160 control and direct fuel as it passes the valve seat 70. In U.S. Patent Publication No. 2006/0108007 A1, each of the conventional fuel passages is of identical configuration which ensures a constant pressure flow. However, this may cause the valve element 80 to resonate when turbulent flow is at the inlet of the regulator. Thus, in accordance with an embodiment, to further prevent or minimize noise particularly when turbulent flow is at the inlet of flow chamber 40, at least one of the fuel passages 170 has a cross-sectional area that is different from the cross-sectional area of the other fuel passages 160. Each of the fuel passages 160 has the same cross sectional area.

With reference to FIGS. 1-4, the fuel tube 30 includes six axially-extending fuel passages circumferentially spaced 60° apart about the periphery of outlet end 180 of the fuel tube 30. Five of the fuel passages 160 are configured identically and have the same radius (e.g., 0.4 mm) defining a bottom 190 of each fuel passage 160. However, fuel passage 170 has a radius (e.g., 0.5 mm) defining the bottom 200 thereof that is larger than the radius defining each bottom 190 of fuel passages 160. Thus, fuel passage 170 defines pressure differential creating structure that creates a pressure differential around the valve element 80 causing unbalanced fuel flow through the outlet end 180 of the fuel tube 30 that will promote the valve element 80 to move towards a certain location at the outlet end 180 when the valve element 80 moves to the open position. This pressure differential reduces the possibility of noise due to the valve element 80 reaching a resonant frequency that may occur when the valve element has equal pressure around all sides thereof (as in the conventional regulator of U.S. Patent Publication No. 2006/0108007 A1).

In the preferred embodiment, the plurality of fuel passages 160, 170 are U-shaped channels, however, others skilled in the art may select alternate shapes including oval, rectangular, V, round or slot form. However, at least one passage 170 must have a cross sectional area that is different from that of all the other passages 160. It can be appreciated that the pressure differential creating structure can include a combination of passages 170 that have cross-sectional areas that are different from the cross-sectional areas of passages 160. It is preferred to have the total number of the plurality of fuel passages 160 and 170 to be greater than or equal to 6. It is also preferred to have the plurality of fuel passages tapered top down such that the width on the top is greater than the width on the bottom.

Figure 5:
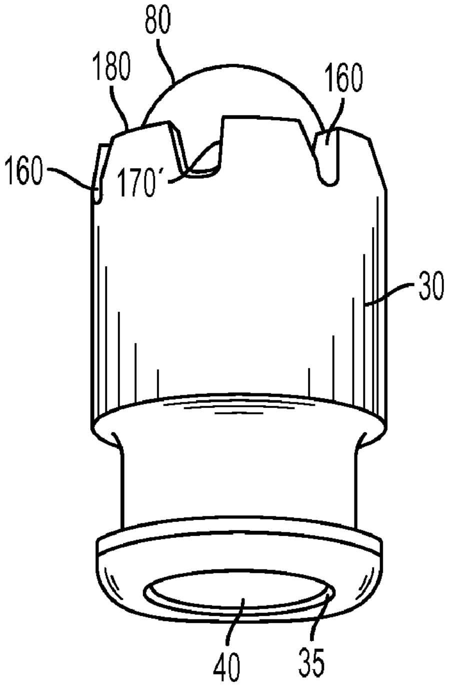
FIG. 5 is a view of the fuel tube and valve element showing another embodiment of the pressure differential creating structure.
Figure 6:
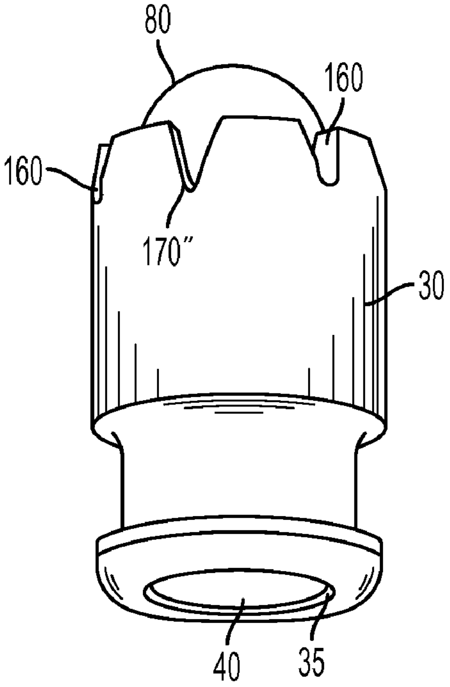
FIG. 6 is a view of the fuel tube and valve element showing yet another embodiment of the pressure differential creating structure.

FIG. 5 shows another embodiment of a fuel passage 170' that is wider than all other identically configured passages 160 and FIG. 6 shows another embodiment of fuel passage 170" that is deeper than all other identically configured passages 160, to create the pressure differential noted above. It can be appreciated that other configurations of the fuel passage 170 can be made so long as the configuration creates a cross sectional area that is different from that of the identical other passages 160 to create the differential pressure around the valve element 80.

An advantage of the unbalanced fuel tube 30 is that it can be manufactured by adding a secondary operation (e.g., further machining) to the conventional configuration.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A flow through pressure regulator comprising:

a fuel tube having an inlet end constructed and arranged to receive fuel, an outlet end, and a fuel chamber between the inlet end and the outlet end, the outlet end defining a valve seat, a valve element constructed and arranged to engage the valve seat in a closed position to prohibit flow of fuel from the inlet end to the outlet end, a valve biasing member constructed and arranged to bias the valve element towards the valve seat in opposition to pressure exerted on the valve element by the fuel in the fuel chamber, and to permit the valve element to move to an open position permitting flow of fuel past the outlet end, when pressurized fuel in the fuel chamber is sufficient to move the valve element, against the bias of the valve biasing member, from engagement with the valve seat, wherein the fuel tube includes pressure differential creating structure at the outlet end thereof constructed and arranged to create a pressure differential around the valve element and cause unbalanced fuel flow at the outlet end to promote the valve element to move towards a certain location at the outlet end when the valve element moves to the open position, and further comprising a plurality of axially-extending fuel passages circumferentially spaced around a periphery of the outlet end of the fuel tube to direct flow of fuel, the pressure differential creating structure being defined by at least one of the fuel passages having a cross sectional area that is different from a cross sectional area of each of the other fuel passages, with all of the other fuel passages being configured to have the same cross sectional area.

2. The regulator of claim 1, wherein each fuel passage is a generally U-shaped channel having a radius defining a bottom thereof, a radius of the at least one fuel passage being greater than a radius of each of all of the other fuel passages.

3. The regulator of claim 1, wherein each of all of the other fuel passages has a certain width and wherein the at least one fuel passage has a width greater than the certain width.

4. The regulator of claim 1, wherein each of all of the other fuel passages has a certain depth and wherein the at least one fuel passage has a depth greater than the certain depth.

5. The regulator of claim 1, wherein the plurality of fuel passages includes six fuel passages spaced 60° apart.

6. The regulator of claim 1, wherein the valve element is a ceramic spherical member.

7. A fuel tube for a flow through fuel pressure regulator, the fuel tube comprising:

a body having an inlet end constructed and arranged to receive fuel, an outlet end, and a fuel chamber between the inlet end and the outlet end, the outlet end defining a valve seat constructed and arranged to engage with a valve element of the regulator, and pressure differential creating structure at the outlet end constructed and arranged to create a pressure differential around the valve element and cause unbalanced fuel flow at the outlet end to promote the valve element to move towards a certain location at the outlet end of the fuel tube when the valve element moves from engagement with the valve seat to an open position, and further comprising a plurality of axially-extending fuel passages circumferentially spaced around a periphery of the outlet end to direct flow of fuel, the pressure differential creating structure being defined by at least one of the fuel passages having a cross sectional area that is different from a cross sectional area of each of the other fuel passages, with all of the other fuel passages being configured to have the same cross sectional area.

8. The fuel tube of claim 7, wherein each fuel passage is a generally U-shaped channel having a radius defining a bottom thereof, a radius of the at least one fuel passage being greater than a radius of each of all of the other fuel passages.

9. The fuel tube of claim 7, wherein each of all of the other fuel passages has a certain width and wherein the at least one fuel passage has a width greater than the certain width.

10. The fuel tube of claim 7, wherein each of all of the other fuel passages has a certain depth and wherein the at least one fuel passage has a depth greater than the certain depth.

11. The fuel tube of claim 7 wherein the plurality of fuel passages includes six fuel passages spaced 60° apart.

12. The fuel tube of claim 7, in combination with the valve element, the valve element being a ceramic spherical member.

13. A method of preventing a valve element of a flow through pressure regulator from resonating in an open position thereof, the method comprising:

providing a fuel tube having an inlet end constructed and arranged to receive fuel, an outlet end, and a fuel chamber between the inlet end and the outlet end, the outlet end defining a valve seat constructed and arranged to engage with a valve element of the regulator, and creating a pressure differential around the valve element thereby causing unbalanced fuel flow at the outlet end to promote the valve element to move towards a certain location at the outlet end of the fuel tube when the valve element moves from engagement with the valve seat to the open position, wherein the creating step includes providing a plurality of axially-extending fuel passages circumferentially spaced around a periphery of the outlet end to direct flow of fuel, with at least one of the fuel passages having a cross sectional area that is different from a cross sectional area of each of the other fuel passages, with all of the other fuel passages being configured to have the same cross sectional area.

14. The method of claim 13, wherein each fuel passage is a generally U-shaped channel having a radius defining a bottom thereof, a radius of the at least one fuel passage being greater than a radius of each of all of the other fuel passages.

15. The method of claim 13, wherein each of all of the other fuel passages has a certain width and wherein the at least one fuel passage has a width greater than the certain width.

16. The method of claim 13, wherein each of all of the other fuel passages has a certain depth and wherein the at least one fuel passage has a depth greater than the certain depth.

17. The method of claim 13, wherein the plurality of fuel passages includes six fuel passages spaced 60° apart.

* * * * *